United States Patent [19]

Terakawa et al.

[11] Patent Number: 5,733,635
[45] Date of Patent: Mar. 31, 1998

[54] LAMINATED NON-WOVEN FABRIC AND PROCESS FOR PRODUCING THE SAME

[75] Inventors: Taiju Terakawa; Shingo Horiuchi; Satoshi Ogata, all of Shiga, Japan

[73] Assignee: Chisso Corporation, Osaka-fu, Japan

[21] Appl. No.: 754,273

[22] Filed: Nov. 20, 1996

[30] Foreign Application Priority Data

Nov. 21, 1995 [JP] Japan ................. 7-303062

[51] Int. Cl.$^6$ ................. B32B 5/06; B32B 5/08; B32B 5/26; B32B 7/20
[52] U.S. Cl. ................. 428/198; 28/362; 28/364; 156/62.4; 156/62.6; 156/308.4; 442/343; 442/346; 442/362; 442/364; 442/382; 442/383; 442/384
[58] Field of Search ................. 28/362, 364; 428/198; 442/343, 346, 362, 364, 382, 383, 384; 156/62.4, 62.6, 308.4

[56] References Cited

U.S. PATENT DOCUMENTS

| | | | |
|---|---|---|---|
| 5,593,768 | 1/1997 | Gessner | 442/346 |
| 5,645,057 | 7/1997 | Wall et al. | 442/346 |

FOREIGN PATENT DOCUMENTS

| | | |
|---|---|---|
| 54-134177 | 10/1979 | Japan . |
| 60-11148 | 3/1985 | Japan . |
| 62-299501 | 12/1987 | Japan . |
| 2-112458 | 4/1990 | Japan . |
| 2-234967 | 9/1990 | Japan . |
| 3-75056 | 3/1991 | Japan . |

*Primary Examiner*—James C. Cannon
*Attorney, Agent, or Firm*—Wenderoth, Lind & Ponack

[57] ABSTRACT

Disclosed is a laminated non-woven fabric of a multi-layer structure comprising a layer of a composite, spun bond non-woven fabric composed of long fibers containing a low melting point resin component and a high melting point resin component, and a layer of a non-woven fabric of melt-blow ultrafine mixed fibers comprising low melting point ultrafine fibers and high melting point ultrafine fibers both of the fibers have an average fiber diameter of 10 μm or less, both of the layers are laminated, and fibers in each of the non-woven fabrics and both of the layers are heat-melt adhered with each other. The laminated non-woven fabric has a good hand feeling and a high peeling strength of adjacent layers, but has no rough feeling.

10 Claims, No Drawings

LAMINATED NON-WOVEN FABRIC AND PROCESS FOR PRODUCING THE SAME

BACKGROUND OF THE INVENTION

1. Field of the Invention

The present invention relates to a laminated non-woven fabric and a process for producing the fabric. More specifically, the present invention is concerned with a non-woven fabric of a multi layer structure in which a layer of a composite, spun bond non-woven fabric and a layer of a non-woven fabric of melt-blow ultrafine mixed fibers are laminated. The non-woven fabrics are preferably used as material, for example, as the surface material of absorptive articles such as paper diapers and sanitary napkins.

2. Description of the Related Art

Spun bond non-woven fabrics have been used as the surface material of absorptive articles such as paper diapers based on the reasons that they have no fuzz and are excellent in the resistance against falling off of fibers. However, it is difficult to produce fine denier long fibers from which spun bond non-woven fabrics are formed, and it is difficult to obtain such a soft hand feeling as that of the melt-blow non-woven fabrics comprising ultrafine fibers. Further, spun bond non-woven fabrics have problems that the break of filaments occurs as the fineness of fibers become small, fibers having a large denier are admixed, and hand feeling of the fabrics is more deteriorated.

Melt-blow non-woven fabrics comprising polypropylene ultrafine fibers are disclosed in Laid-open Japanese Patent Publication No. Sho 54-134177, and paper diapers comprising a melt-blow non-woven fabric as surface material are disclosed in Laid-open Japanese Patent Publication Nos. Sho 62-299501 and Hei 3-75056. Whereas such melt-blow non-woven fabrics have the advantage that hand feeling is soft since the melt blow non-woven fabrics comprise fibers of a small fiber diameter, the fabrics have problems that the strength of the non-woven fabrics is low, the non-woven fabrics have fuzz, and fibers are ready to fall off from the fabrics. Besides, polymer particles are ready to form at the time of spinning, and the fabrics have a rough feeling and irritate the skin. Thus the fabrics were unsuitable to paper diapers particularly for newborn babies. Pressing the fabrics with a heated calender roll or a heated embossing roll has been conducted for the purpose of increasing the strength of melt-blow non-woven fabrics and preventing falling off of fibers. Conversely, however, it is necessary to treat fabrics under sever conditions on temperature and pressure, and thus there were inconveniences that apparent density of non-woven fabrics becomes high and hand feeling is deteriorated.

Japanese Patent Publication No. Sho 60-11148 and Laid-open Japanese Patent Publication Nos. Hei 2-112458 and Hei 2-234967 have disclosed laminated non-woven fabrics produced by laminating a layer of a spun bond non-woven fabric with a layer of a melt-blow non-woven fabric and then heat-melt adhering both layers by using a heated calender roll or heated embossing roll. Such non-woven fabrics are improved in their strength compared with conventional single layer non-woven fabrics. However, the fabrics comprise regular fibers as long fibers from which spun bond non-woven fabrics are formed, and thus the fabrics have such problems that heat-melt adhesion at laminated layers, resistance to falling off of fibers, and peeling strength are low. Also, sever heat pressing conditions similar to those mentioned above are required for pressing a fabric with a heated embossing roll, apparent density increases, and hand feeling of fabrics is deteriorated.

SUMMARY OF THE INVENTION

An object of the present invention is to provide laminated non-woven fabrics having a high strength, soft hand feeling, high resistance against falling off of fibers, and high peeling strength, but having no rough feeling, and no irritation to the skin, and to provide a process for producing the laminated non-woven fabrics.

In order to solve the problems mentioned above, the present invention is summarized as follows:

(1) A laminated multi-layer non-woven fabric comprising a layer of a composite, spun bond non-woven fabric and a layer of a non-woven fabric of melt-blow ultrafine mixed fibers comprising fibers having an average fiber diameter of 10 μm or less, and laminated with the layer of the composite, spun bond non-woven fabric, the composite, spun bond non-woven fabric comprises composite long fibers containing a low melting point resin component and a high melting point resin component having a melting point difference of 10° C. or more, the low melting point resin component forms at least a part of fiber surface, the composite long fibers are heat-melt adhered through the melt of the low melting point resin component, the non-woven fabric of melt-blow ultrafine mixed fibers comprises 10 to 90% by weight of low melting point ultrafine fibers and 90 to 10% by weight of high melting point ultrafine fibers, melting point difference between the low melting point ultrafine fibers and the high melting point ultrafine fibers is 10° C. or more, the low melting point ultrafine fibers and the high melting point ultrafine fibers are heat-melt adhered through the melt of the low melting point ultrafine fibers, and the layer of the composite, spun bond non-woven fabric and the layer of the non-woven fabric of melt-blow ultrafine mixed fibers are integrated through heat-melt adhesion or the melt of the low melting point resin component in the composite, spun bond non-woven fabric and/or the low melting point ultrafine fibers in the non-woven fabric of melt-blow ultrafine mixed fibers.

(2) The laminated multi-layer non-woven fabric recited in (1) above wherein the composite long fibers in the composite, spun bond non-woven fabric have a fineness of 0.5 to 10 d/f, the ultrafine fibers in the non-woven fabric of melt-blow ultrafine mixed fibers have a fiber diameter of 0.1 to 10 μm, the non-wove fabric of melt-blow ultrafine mixed fibers has 10/m$^2$ or less of, or no polymer particles having a diameter of 0.1 mm or more on the surface thereof (or does not have such polymer particles) and an apparent density of 0.02 to 0.20 g/cm$^3$, the laminated non-woven fabric has a lateral strength of 0.6 kg/5 cm or more, a uniformity index of 0.6 or less, and a peeling strength of the two layers of 6 g/5 cm or more.

(3) An absorptive article comprising, as at least one constituent member thereof, a laminated multi-layer non-woven fabric recited in (1) or (2) above.

(4) The absorptive article recited in (3) above wherein the absorptive article comprises a laminated multi-layer non-woven fabric of two layer structure comprising a composite, spun bond non-woven fabric and a non-woven fabric of melt-blow ultrafine mixed fibers; or comprises a laminated multi-layer non-woven fabric of three- or more-layer structure comprising one or more non-woven fabric of melt-blow ultrafine mixed fibers and one or more composite, spun bond non-woven fabric, and the non-woven fabric of melt-blow ultrafine mixed fibers being arranged on the surface of at least one side of the laminated multi-layer non-woven fabric.

(5) A process for producing a laminated multi-layer non-woven fabric comprising the steps of;

spinning a low melting point resin and a high melting point resin having a melting point difference of 10° C. or more to form composite long fibers in such a manner that the low melting point resin forms at least a part of fiber surface; forming a web or forming a non-woven fabric by heating the web after the spinning at the heat-melt adhering temperature of the web or higher to form a non-woven fabric in which fibers are heat-melt adhered, by a composite, spun bond method;

forming low melting point ultrafine fibers and high melting point ultrafine fibers both of the fibers have an average fiber diameter of 10 μm or less, and have a melting point difference between both of the fibers of 10° C. or more into a web of ultrafine mixed fibers having no self-heat-melt adhesion at the time of the spinning, into a non-woven fabric having self-heat-melt adhesion at the time of the spinning, or into a non-woven fabric of melt-blow mixed fibers in which fibers are heat-melt adhered by heating the web after the spinning at the heat-melt adhering temperature of the web or higher, and each comprises 10 to 90% by weight of low melting point ultrafine fibers and 90 to 10% by weight of high melting point ultrafine fibers, by a melt-blow mixed fiber method;

laminating the layer of the composite, spun bond web or heat-melt adhered non-woven fabric with the layer of the web of melt-blow ultrafine mixed fibers or heat-melt adhered non-woven fabric melt-blow ultrafine mixed fibers, and heating them at the temperature at which both of the layers are heat-melt adhered or higher.

(6) The process for producing a laminated multi-layer non-woven fabric recited in (5) above wherein the process further comprises a step in which fibers in the web or non-woven fabric in a layer are entangled with fibers in the web or non-woven fabric in another layer with a needle punch or a spunlace mean before or after heating.

(7) The process for producing a laminated multi-layer non-woven fabric recited in (5) or (6) above wherein the heating is performed by using a through-air type heater and heated air is ejected from the side of the composite, spun bond non-woven fabric to the side of the non-woven fabric of melt-blow ultrafine mixed fibers.

(8) The process for producing a laminated multi-layer non-woven fabric recited in (5) or (6) above wherein both of the layers are heat-pressed by using an embossing roll having a heat-pressing area of 5 to 25%.

(9) The process for producing a laminated multi-layer non-woven fabric recited in (5) or (6) above wherein a composite, spun bond non-woven fabric and a non-woven fabric of melt-blow ultrafine mixed fibers both having a uniformity index of 0.6 or less are used.

(10) The process for producing a laminated multi-layer non-woven fabric recited in (5) or (6) above wherein both of the layers are heated by using a heater of a type from which heated air is ejected alternately, and heated air is ejected alternately from the front surface or back surface of the non-woven fabric of a multi-layer structure.

DESCRIPTION OF THE PREFERRED EMBODIMENTS

It is sufficient for the non-woven fabrics having a multi-layer structure of the present invention that the non-woven fabrics have a structure of at least two layers in which a composite, spun bond non-woven fabric and a non-woven fabric of melt-blow ultrafine mixed fibers are laminated. When the end uses of the fabrics are surface materials of paper diapers, wipers, or the like, non-woven fabrics of two or three layers are used, and when the end uses are heat insulating materials or materials for preventing dew condensation, non-woven fabrics of two to eight layers are used.

Composite, spun bond non-woven fabrics used in the non-woven fabrics of a multi-layer structure of the present invention are composed of fibers obtained by spinning at least two resin components having a difference in melting point of 10° C. or more, and are produced by a composite spun bond method. Crossing points of fibers in the non-woven fabrics are heat-melt adhered. The composite spun bond method includes a method in which a plural number of resin components are melt extruded with a plural number of extruders through a spinneret to form long fibers in such a manner that a low melting point resin forms at least a part of fiber surface, the fibers thus formed are taken up with an apparatus of air current drawing type such as an air sucker, the fibers are collected together with air current with a web collecting apparatus such as a net conveyer to form a web, and then the web is subjected to a treatment such as a heat-melt adhesion by using a heating means such as a heated air and heated roll, if necessary. It may be possible to mechanically stretching the fibers at a step between the spinning step and fiber collecting step, taking up the fibers with an apparatus of air current drawing type such as an air sucker, and then collecting the fibers with the fiber collecting apparatus mentioned above. As the resin components, practically two to four kinds of resins can be used. However, for most end uses, the use of two kinds of resins is satisfactory. It is sufficient if there exists a difference of 10° C. or more between a highest melting point and a lowest melting point of the resins.

Non-woven fabrics having a uniformity index of "metsuke" described below of 0.6 or less are especially desirable. Uniformalization of the metsuke can be achieved by using a proper composite spun bonding apparatus and adopting proper conditions for spinning and the like selected through trial-and-error tests.

There is no specific restriction on the resins used in the present invention as far as the resins can be spun into fibers. For example, polyolefins such as a polypropylene, high density polyethylene, medium density polyethylene, low density polyethylene, linear low density polyethylene, and copolymer or terpolymer of propylene with other α olefins, polyamides, polyethylene terephthalate, polybutylene terephthalate, low melting point polyesters prepared by copolymerizing a diol with terephthalic acid and/or isophthalic acid, polyesters such as a polyester elastomer, fluorine resins, mixtures of those resins, and other spinnable resins.

As the combination of resins when they are subjected to a composite spinning, combinations of, for example, a high density polyethylene/polypropylene, low density polyethylene/propylene-ethylene-butene-1 crystalline copolymer, propylene-ethylene-butene-1 crystalline copolymer/polypropylene, high density polyethylene/ polyethylene terephthalate, nylon-6/nylon 66, low melting point polyester/polyethylene terephthalate, polypropylene/ polyethylene terephthalate, polyvinylidene fluoride/ polyethylene terephthalate, and a mixture of linear low density polyethylene with high density polyethylene/ polypropylene can be mentioned as examples.

Shape of composite fibers may be any of sheath-core, side-by-side, multi-layer, and hollow multi-layer. Melting point difference between a low melting point resin and a high melting point resin must be 10° C. or more. When the melting point difference is less than 10° C., temperature control at the heat treatment is difficult when a composite, spun bond non-woven fabric or a laminated non-woven fabric with a non-woven fabric of melt-blow ultrafine mixed fibers is produced, the extent of heat-melt adhesion becomes insufficient, and thus a non-woven fabric having a high strength can not be obtained. Alternatively, creases are produced, or whole non-woven fabric is melted to form a partially filmnized non-woven fabric due to the heating at a high temperature. Also, the resistance of a non-woven fabric against falling off of fibers becomes insufficient and the fabric becomes ready to peel off at a laminated face.

Composite ratio of a low melting point resin to a high melting point resin in the composite long fibers for the spun bond non-woven fabric is 10 to 90% by weight of a low melting point resin to 90 to 10% by weight of a high melting point resin. The ratio is preferably 30 to 70% by weight of a low melting point resin to 70 to 30% by weight of a high melting point resin. When the amount of a low melting point resin component is less than 10% by weight, heat-melt adhesion of the composite, spun bond non-woven fabric itself becomes insufficient, or heat-melt adhesion at the laminated face of the non-woven fabric with the non-woven fabric of melt-blow ultrafine mixed fibers mentioned above becomes insufficient, leading to a laminated non-woven fabric which is poor in strength, resistance to falling off of fibers, and peeling strength.

As to the fineness of the composite long fibers, there is no specific restriction. However, in the case of surface materials for paper diapers, about 0.2 to about 10 d/f; for wipers about 0.5 to about 20 d/f; and for filters about 0.2 to 4,000 d/f are preferable. While metsuke of the non-woven fabric is not specifically restricted, it is usually about 4 to about 1,000 g/m². In the case of surface materials of paper diapers, metsuke is usually about 4 to about 70 g/m², for wipers about 10 to about 600 g/m², and for filters about 20 to about 1,000 g/m².

Composite, spun bond non-woven fabrics having a still high strength can be obtained by using a heating apparatus such as a heated-air through type heating apparatus, heated calender roll, or heated embossing roll. In the present invention, it is preferable to control heating conditions by using the heating apparatus mentioned above to make the strength of the non-woven fabrics 0.6 kg/5 cm or higher in lengthwise and lateral directions.

Non-woven fabric of melt-blow ultrafine mixed fibers in the present invention means the non-woven fabric obtained by independently melt extruding at least two kinds of thermoplastic resins having a difference in melting point of 10° C. or more through orifices of a melt-blow spinneret of mixed fiber spinning type in such a manner that low melting point ultrafine fibers and high melting point ultrafine fibers are mixed in fiber state immediately after the extrusion from the spinneret, subjecting the fibers thus formed to a blow spinning as a stream of ultrafine mixed fibers with a high temperature and high speed gas, collecting the formed ultrafine mixed fibers with a collecting means to form a web, and then subjecting the web to a heat-melt adhering treatment, if necessary.

Non-woven fabric of melt-blow ultrafine mixed fibers used in the present invention comprises 10 to 90% by weight of low melting point fibers and 90 to 10% by weight of high melting point fibers having a melting point difference of 10° C. or more. When the amount of the low melting point ultrafine fibers is less than 10% by weight, heat-melt adhesion of the melt-blow non-woven fabric becomes insufficient and the resistance against falling off of fibers is lowered.

As the resins, such various kinds of resins as used for the composite, spun bond can be used. Also, as the combination of resins, such various combinations as disclosed with respect to the composite, spun bond mentioned above are possible. For example, combinations of a high density polyethylene/polypropylene, low density polyethylene/propylene-ethylene-butene-1 crystalline copolymer, propylene-ethylene-butene-1 crystalline copolymer/polypropylene, high density polyethylene/polyethylene terephthalate, and low melting point polyester/polyethylene terephthalate can be mentioned.

As the gas used at the time of blow spinning, an inert gas such as air and nitrogen gas is usually used. Temperature of the gas is usually about 200° to about 500° C. and preferably about 250° to about 450° C., and the pressure is usually about 0.1 to about 6 kg/cm² and preferably about 0.2 to about 5.5 kg/cm².

This non-woven fabric is composed of ultrafine mixed fibers having an average fiber diameter of 10 μm or less. The average fiber diameter is preferably 0.1 to 9 μm and more desirably 0.2 to 8 μm. When the average fiber diameter exceeds 10 μm, hand feeling of the non-woven fabric is deteriorated. Besides, fibers having an average fiber diameter of less than 0.1 μm are difficult to produce and thus the price of the fibers is raised when such fibers were produced.

Melt-blow non-woven fabrics used in the present invention are preferably those in which polymer particles existing on their surface is 10/m² or less. More desirably, polymer particles do not exist. In the present specification, the term "polymer particles" means polymers in not-fiber shapes such as circle, ellipse, or tear drops having a diameter of 0.1 mm or more. When the amount of polymer particles increased, non-woven fabrics have a rough feeling and irritate the skin, and thus such non-woven fabrics can not be used for end uses in which the non-woven fabrics directly contact with the skin, for example, for surface materials of paper diapers and base clothes for a pap agent, even if the hand feeling of the non-woven fabrics is soft. Further, whereas the wipers for glasses and furniture preferably have a melt-blow non-woven fabric on both surfaces, such wipers sometimes produce fine scratches on the surface of glasses and furniture in addition to exhibit a rough feeling.

In the present invention, non-woven fabrics having a uniformity index of metsuke of 0.6 or less are preferably used in particular. Such non-woven fabrics can be obtained by properly selecting conditions for melt-blow mixed fiber spinning and a suitable apparatus and the like.

In the non-woven fabrics of melt-blow ultrafine mixed fibers used in the present invention, crossing points of fibers are heat-melt adhered. The heat-melt adhesion may be those formed through melt adhesion with the heat of themselves afforded at the time of spinning or formed by using a heated through air, heated calender roll, or heated embossing roll after spinning. As to the metsuke of the non-woven fabrics, there exists no specific restriction. However, it is usually about 3 to about 1,000 g/m². In the case of surface materials of paper diapers, metsuke is usually about 3 to about 60 g/m², in the case of wipers usually about 5 to about 500 g/m², and in the case of filters, usually about 15 to about 1,000 g/m². As to apparent density of the non-woven fabrics, there is no specific restriction. However, it is preferably about 0.02 to about 0.40 g/cm³ when hand feeling is taken into consideration.

Laminated non-woven fabrics of the present invention can be produced by laminating a layer of the composite, spun bond non-woven fabric and a layer of the melt-blow non-woven fabric mentioned above, and heating them by using a heating means such as a through heated air type heating apparatus, alternately heated air ejecting type heating apparatus, heated calender roll, heated embossing roll, or sonic bond to heat-melt adhere both layers. When a through heated air type heating apparatus or alternately heated air ejecting type heating apparatus are used, laminated non-woven fabrics in which the melt-blow non-woven fabric has a comparatively high bulkiness can be obtained. In the case where a through heated air type heating apparatus is used, when heat treatment is conducted in such a manner that the heat penetrates through the laminated non-woven fabric from the side of a spun bond non-woven fabric composed of fibers having a comparatively large denier to the side of a melt-blow non-woven fabric composed of having a comparatively small denier, heat is uniformly applied and peeling strength between both layers can increase. On the contrary, when laminated non-woven fabrics are heated by a through air heating with the side of melt-blow non-woven fabric being positioned facing toward heated air ejecting port, peeling strength of both layers can be controlled by properly setting the pressure of heated air, conditions for sucking the air, and the like since single fibers of melt-blow ultrafine fibers cut into the layer of spun bond non-woven fabric and heat-melt adhered both inside of the spun bond non-woven fabric and between both layers. Also, when a heating apparatus from which heated air is ejected alternately from the front surface side and from back surface side of the non-woven fabric, laminated non-woven fabrics having a high bulkiness can be obtained. Further, laminated non-woven fabrics having a high peeling strength can be obtained by laminating both non-woven fabrics, subjecting them to a fiber entangling treatment by a needle punch process or spunlace process using water streams, and then heat treating. Heating temperature is satisfactorily one at which a low melting point resin component in the composite long fibers which constitute a composite spun bond non-woven fabric or low melting point ultrafine fibers which constitute a melt-blow non-woven fabric is softened or higher than that temperature. Heating of both layers also serve for heat-melt adhering fibers together in either or both of the laminated non-woven fabrics. Also, when heating is performed by a heated embossing roll, heat-pressing area of the roll is preferably 5 to 25%. When the heat-pressing area is less than 5%, resistance against falling off of fibers and strength of non-woven fabrics are lowered. Conversely, when it exceeds 25%, hand feeling becomes stiff.

In the present invention, it is preferable to make peeling strength of both layers 6 g/5 cm or higher by properly selecting heating conditions, a low melting point resin in the constituent fibers of composite, spun bond non-woven fabrics, and low melting point ultrafine fibers in the non-woven fabrics of melt-blow ultrafine mixed fibers. The peeling strength is usually 6 to 5,000 g/5 cm and preferably about 10 to about 4,000 g/5 cm. When the peeling strength is lower than 6 g/5 cm, both layers are readily peeled away by rubbing and thus, the laminated non-wove fabrics become insufficient materials for paper diapers and the like. When the same resin is used both for a low melting point resin in the constituent fibers of the composite, spun bond non-woven fabrics and for low melting point fibers in the melt-blow ultrafine mixed fibers, laminated non-woven fabrics having a remarkably high peeling strength can be obtained. Since the laminated fabrics of the present invention employ the high strength of the composite, spun bond non-woven fabric, the laminated fabrics preferably have a lateral strength of 0.6 kg/5 cm or higher when converted into a metsuke of the non-woven fabric of 40 g/m². In the present specification, the term "lateral strength" means the strength of a layer of a composite, spun bond non-woven fabric in so-called cross machine direction (CD). When the composite, spun bond layer is a multi-layer, it means a vertical (lengthwise) strength or lateral strength, whichever is lower. Also, when apparent density of the melt-blow non-woven fabrics after lamination is 0.02 to 0.20 g/cm³, the laminated non-woven fabrics are particularly preferable since the soft hand feeling of ultrafine fibers which constitute the melt-blow non-woven fabrics can advantageously be employed in various end uses, for example, for surface materials of paper diapers. The apparent density is preferably about 0.02 to 0.20 g/cm³ in the case of surface materials of paper diapers and wipers, and about 0.025 to 0.40 g/cm³ in the case of filter materials.

In the present invention, laminated non-woven fabrics having a uniformity index of metsuke of 0.6 or less are particularly preferable. Such laminated non-woven fabrics can be obtained by using a composite spun bond non-woven fabric and a non-woven fabric of ultrafine mixed fibers both having a uniformity index of metsuke of 0.6 or less.

Laminated non-woven fabrics of the present invention are used in various end uses by themselves or after laminated, sewed, or heat-melt adhered with another of other materials. For instance, when they are used as a member of pants type disposable diapers, they can be used for the portion where comparatively water repellency is required, for example, as the material for inside portion nearby the trunk of the body and as the material for inside portion nearby the legs. When the portion nearby the legs is provided with a long and narrow steric barrier to prevent the liquid leakage towards inside, they can be used as the steric barrier material after combined with another material, for example, by heat-melt adhesion. As a matter of course, when they are used for diapers and the like, an expansible material for closely contacting with the trunk or leg portions can be used in combination with other materials. Also, the laminated non-woven fabrics can be used as cover materials for pants type disposable diapers with the side of the non-woven fabric of melt blow ultrafine mixed fibers being positioned outside or inside. Further, the laminated non-woven fabrics can be used as the cover materials for the surface materials mentioned above or the cover materials for the back surface materials mentioned above after laminated with another non-woven fabric, tissue paper, web, or film.

In order to make a liquid or moisture quickly pass through any layer of a non-woven fabric in the laminated non-woven fabrics or whole of the laminated non-woven fabrics, the laminated non-woven fabrics can be provided with many permeating pores having a size of about 0.1 to about 9 mm² to use as a material of the front surface or back surface material mentioned above. Further, the laminated, multi-layer non-woven fabrics can be applied with a water repellent finishing agent or hydrophilic finishing agent.

Laminated, multi-layer non-woven fabrics of the present invention can be used as wipers for furniture and the like in such a laminate structure as melt-blow non-woven fabric/composite, spun bond non-woven fabric/melt-blow non-woven fabric, and after applied with a conventional lubricant or the like.

Further, the laminated non-woven fabrics of the present invention can be made into filter materials by subjecting the fabrics to a processing treatment such as a pleat processing, forming into a cylindrical shape, winding as they are to form into a cylindrical shape, and winding while heating to form into a heat-melt adhered cylindrical shape.

Now, the present invention will be described in more detail with reference to Examples and Comparative Examples. However, it should be understood that the present invention is by no means restricted by such specific examples.

In the Examples and Comparative Examples, evaluation of non-woven fabrics were conducted by the methods as follows:

Fiber diameter: Ten small pieces were cut off from a sample web or non-woven fabric, photographs of 100 to 5,000 magnifications were taken with a scanning type electron microscope, fiber diameter of total 100 fibers were determined, and the average value was regarded as fiber diameter (unit: μm).

Strength of non-woven fabric: Breaking strength (kg/5 cm) of lengthwise direction and that of lateral direction of a sample non-woven fabric of 5 cm wide were determined by using a tensile strength tester, and the average value of 5 determinations was regarded as the strength of non-woven fabric in each direction.

Hand feeling: Hand feeling of a sample non-woven fabric was evaluated by 5 panelists from the viewpoints of crease, softness, and rough feeling, and graded according to the following standard:

Good: Three or more panelists found that the sample non-woven fabric had no crease, a high softness, and no rough feeling.

Poor: Three or more panelists found that the sample non-woven fabric had creases, was inferior in softness, or had a rough feeling, or two or three of them.

Polymer particles: Ten sheets of non-woven fabric having a size of 20 cm×20 cm were randomly cut off, and the number of polymer particles having a diameter of 0.1 mm or more existing on the surface of the sheets was counted by using a microscope (unit: number/m²).

Fiber falling off: A sheet of non-woven fabric having a size of 20 cm×20 cm was cut off and placed horizontally. A hand was wetted with water, and rubbed the surface of the sheet with the hand 5 times continuously in such a manner as drawing a circle while slightly pressing the surface of the sheet. Thereafter, the presence of fibers attached on the hand was confirmed, and graded as follows:

Yes: Fibers fell from the sheet of non-woven fabric existed on the hand.

No: Fibers fell from the sheet of non-woven fabric did no exist on the hand.

Peeling strength: A sample laminated non-woven fabric of 5 cm wide was cut off from a large laminated non-woven fabric. Laminated surface at an end portion in the sample fabric was cut open with a razor to prepare the portions for nipping with a tensile strength tester, and peeling strength was determined by using the tester. An average value of 5 determinations was regraded as peeling strength (unit: g/5 cm).

Uniformity index of metsuke of non-woven fabric: Forty sample pieces having a size of 5 cm×5 cm were randomly cut off from a laminated non-woven fabric, and metsuke (g/m²) of each of the sample pieces were determined. The uniformity index was calculated by the following equation:

Uniformity index=(maximum metsuke-minimum metsuke)/average metsuke

EXAMPLE 1

Heat-melt adhered composite, spun bond non-woven fabric was prepared by using a composite, spun bond manufacturing apparatus provided with a composite spinning machine, air sucker, net conveyer, and heater. Spinneret used was one for sheath-core type composite spinning having an orifice diameter of 0.4 mm. Spinning was conducted by using a high density polyethylene having a melting point of 133° C. and MFR of 22 (190° C., g/10 min) as a first component for sheath side and a polypropylene having a melting point of 164° C. and MFR of 60 (230° C., g/10 min) as a second component for core side, and extruding at a composite ratio of 50/50 (% by weight) and at an extrusion temperature of 285° C. for the first component and that of 300° C. for the second component. Fibers thus formed were sucked with an air sucker at a rate of 3,000 m/min and blown on a net conveyer together with the air. Blown air was sucked and removed with an aspiration exhaust apparatus provided below the net conveyer. Fibers in the web thus obtained had a fineness of 1.5 d/f. The web was heated with a through air type heater at 145° C. to obtain a non-woven fabric in which fibers were heat-melt adhered together. The non-woven fabric had a metsuke of 18 g/m², uniformity index of 0.25, strength of lengthwise direction of 2.97 kg/5 cm, and strength of lateral direction of 1.75 kg/5 cm.

In a separate step, a melt-blow non-woven fabric was prepared by using a melt-blow spinning apparatus provided with a melt-blow spinneret having an orifice diameter of 0.3 mm and a net conveyer. In this spinneret, the spinning orifices for a first component and the spinning orifices for a second component were alternately arranged at a ratio of the number of orifice of 1/1 so that the fibers formed were mixed in a state of web immediately after spinning. Spinning was conducted by extruding a propylene-ethylene-butene-1 terpolymer having a melting point of 137° C. and MFR of 76 (230° C., g/10 min) as a first component and a polypropylene having a melting point of 166° C. and a MFR of 82 (230° C., g/10 min) at a ratio of the extrusion amount of both components of 50/50 (% by weight) and at an extrusion temperature of 260° C. for the first component and 285° C. for the second component. Fibers thus formed were subjected to a blowing with heated air under the conditions that the temperature of heated air was 370° C. and pressure of that air was 1.4 kg/cm², and blown on a net conveyer. Blown air was sucked and removed with an aspiration exhaust apparatus provided below the net conveyer. Fibers in the web thus obtained had a fiber diameter of 2.1 μm. The web was heated by using a through air type heater at 140° C. to obtain a non-woven fabric in which crossing points of fibers were heat-melt adhered by the melt of the low melting point ultrafine fibers.

The non-woven fabric had a metsuke of 19 g/m², uniformity index of 0.16, strength of lengthwise direction of 1.53 kg/5 cm, strength of lateral direction of 0.81 kg/5 cm, and apparent density of 0.059 g/cm³.

Next, the composite, spun bond non-woven fabric and the melt-blow non-woven fabric each mentioned above were laminated and heated by using a through air type heater at 145° C. to obtain a laminated non-woven fabric having a two-layer structure and both layers in which laminated fabric were heat-melt adhered. Heat treatment was conducted in such a manner that the heated air was ejected from the side of the composite, spun bond non-woven fabric to the side of the non-woven fabric of melt-blow ultrafine mixed fibers. Metsuke of the laminate was slightly increased to 39 g/m² by the heat treatment after the lamination. The laminated non-woven fabric thus obtained had a uniformity index of 0.22, strength of lengthwise direction of 5.91 g/5 cm, and strength of lateral direction of 4.21 kg/5 cm. Apparent density of the melt-blow non-woven fabric determined after cutting the laminated surface of the laminated non-woven fabric with a razor and peeling off the fabric was slightly increased to 0.063 g/cm³ by the heat treatment after lamination.

Laminated non-woven fabric thus obtained had a good hand feeling, no falling off of fibers, no polymer particles, and peeling strength of 136 g/5 cm.

EXAMPLE 2

Non-woven fabric of melt-blow ultrafine mixed fibers was prepared in the same manner as in Example 1 with the following exceptions:

A spinneret in which spinning orifices for a first component and spinning orifices for a second component were perforated at a ratio of ½ was used. Spinning was conducted by using a linear low density polyethylene having a melting point of 122° C. and MFR of 122 (190° C., g/10 min) as a first component and a polypropylene having a melting point of 165° C. and MFR of 120 (230° C., g/10 min) as a second component, and extruding the first component at an extrusion temperature of 260° C., and extruding the second component at an extrusion temperature of 270° C. Blowing was conducted under such conditions that the temperature of the heated air was 350° C. and the pressure of the air was 1.9 kg/cm², and blown on a net conveyer. Heat treatment after spinning with an air through type heater was not conducted.

The web thus obtained was a mixed fiber web having a mixing ratio of low melting point fibers to high melting point fibers of 33.3% by weight to 66.7% by weight. Fibers in the web thus obtained had a fiber diameter of 3.7 μm. The web had heat-melt adhesion at the crossing points of fibers due to the heat of themselves afforded at the time of spinning, and thus the web was something like a non-woven fabric. The web had a metsuke of 20 g/m², uniformity index of 0.30, strength of lengthwise direction of 1.04 kg/5 cm, strength of lateral direction of 0.76 kg/cm, and apparent density of 0.049 g/cm³.

Then, the spun bond non-woven fabric obtained in Example 1 and the melt-blow non-woven fabric which was not subjected to a heat treatment after spinning and mentioned above were laminated and heated in the same manner as in Example 1 at 145° C. to obtain a laminated non-woven fabric having a two-layer structure and both layers in which laminated fabric were heat-melt adhered. Heat treatment was conducted by ejecting heated air from the side of the layer of spun bond non-woven fabric. Metsuke of the laminate was slightly increased to 39 g/m² by the heat treatment. The laminated non-woven fabric had a uniformity index of 0.26, strength of lengthwise direction of 4.33 kg/5 cm, and strength of lateral direction of 3.76 kg/5 cm. Further, apparent density of the melt-blow non-woven fabric determined after cutting the laminated surface of the laminated non-woven fabric with a razor and peeling off the fabric was slightly increased to 0.051 g/cm³ by the heat treatment after lamination.

Laminated non-woven fabric thus obtained had a good hand feeling, no falling off of fibers, no polymer particles, and peeling strength of 209 g/5 cm.

COMPARATIVE EXAMPLE 1

Melt-blow non-woven fabric was prepared in the same manner as in Example 1 with the following exceptions:

A spinneret for regular fibers and having orifice diameter of 0.3 mm was used. Spinning was conducted by using a polypropylene having a melting point of 167° C. and MFR of 21 (230° C., g/10 min) and extruding at an extrusion temperature of 300° C. Blowing was conducted under such conditions that the temperature of the heated air was 360° C. and the pressure of the air was 1.5 kg/cm² to obtain a web of ultrafine fibers. Heat treatment with a through air type heater after spinning was not conducted.

Fibers in the web thus obtained had a fiber diameter of 8.9 μm. The web had heat-melt adhesion between fibers due to the heat of themselves afforded at the time of spinning, and thus the web was something like a non-woven fabric. The web had a metsuke of 18 g/m². The web was found to have polymer particles by observation through the naked eye and touch with hands. The web had a uniformity index of 0.32, strength of lengthwise direction of 0.88 kg/5 cm, strength of lateral direction of 0.75 kg/5 cm, and apparent density of 0.070 g/cm³.

Then, a spun bond non-woven fabric comprising polyethylene terephthalate fibers having a fineness of 2.6 d/f, and having a metsuke of 20 g/m², uniformity index of 0.08, strength of lengthwise direction of 4.33 kg/5 cm, and strength of lateral direction of 3.01 kg/5 cm was laminated with the melt-blow non-woven fabric mentioned above, and heated in the same manner as in Example 1 at 158° C. to obtain a laminated non-woven fabric having a two-layer structure and both layers in which laminated non-woven fabric were slightly heat-melt adhered. The spun bond non-woven fabric was heat-melt adhered in advance with an embossing roll. Metsuke of the laminate was slightly increased to 40 g/m² by the heat treatment. Also, the laminated non-woven fabric had a uniformity index of 0.64, strength of lengthwise direction of 6.85 kg/5 cm, and strength of lateral direction of 4.27 kg/5 cm. Further, apparent density of the melt blow non-woven fabric determined after peeling off the laminated surface of the laminated non-woven fabric was slightly increased to 0.084 g/cm³ by the heat treatment after lamination. In the laminated non-woven fabric, creases were produced in a wave-like shape on the melt-blow non-woven fabric.

Laminated non-woven fabric thus obtained had no falling off of fibers. However, the laminated non-woven fabric was poor in softness, and had rough feeling and a property of irritating the skin, and was poor in hand feeling due to the particles. Number of polymer particles was 26/m² and peeling strength was 5 g/5 cm.

COMPARATIVE EXAMPLE 2

Non-woven fabric of melt-blow ultrafine mixed fibers was prepared in the same manner as in Example 1 using the same resin both for a first component and a second component with the following exceptions:

Extrusion was conducted at a temperature of 240° C. both for a first component and a second component. Blowing was conducted under such conditions that the temperature of the heated air was 260° C. and the pressure of the air was 0.9 kg/cm² to obtain a web of ultrafine fibers. Heat treatment after spinning was not conducted.

Fibers in the web thus obtained had a fiber diameter of 16.3 μm. The web had heat-melt adhesion at the crossing points of fibers due to the heat of themselves afforded at the time of spinning, and thus the web was something like a non-woven fabric. The web had a metsuke of 19 g/m², uniformity index of 0.23, strength of lengthwise direction of 1.33 kg/5 cm, strength of lateral direction of 0.86 kg/cm, and apparent density of 0.062 g/cm³.

Then, the spun bond non-woven fabric obtained in Example 1 and the melt-blow non-woven fabric mentioned above were laminated and heated in the same manner as in Example 1 at 150° C. to obtain a laminated non-woven fabric having a two-layer structure and both layers in which laminated non-woven fabric were heat-melt adhered. Metsuke of the laminate was slightly increased to 38 g/m² by the heat treatment. Also, the laminated non-woven fabric had a uniformity index of 0.22, strength of lengthwise direction of 4.66 kg/5 cm, and strength of lateral direction of 3.13 kg/5 cm. Further, apparent density of the melt blow non-woven fabric determined after cutting the laminated surface of the laminated non-woven fabric with a razor and peeling off the laminated surface of the laminated non-woven fabric slightly increased to 0.064 g/cm³ by the heat treatment after lamination.

Laminated non-woven fabric thus obtained had no falling off of fibers, no polymer particles, and a peeling strength of 97 g/5 cm. However, hand feeling was harsh and poor since the diameter of fibers which constitute the melt-blow non-woven fabric was large.

EXAMPLE 3

Composite, spun bond non-woven fabric was prepared by the same method as in Example 1 with the following exception:

Spinning was conducted by using a propylene-ethylene-butene-1 terpolymer having a melting point of 135° C. and MFR of 76 (230° C., g/10 min) as a first component for sheath side and a polyethylene terephthalate having a melting point of 257° C. as a second component for core side, and extruding at a composite ratio of 50/50 (% by weight), and at a temperature of 280° C. for the first component and at 295° C. for the second component. Fibers thus formed were sucked with an air sucker at a rate of 2,647 m/min and blown on a net conveyer together with air. Fibers in the web thus obtained had a fineness of 1.7 d/f. The web was heat treated with a through air type heater at a temperature of 152° C. to obtain a non-woven fabric in which fibers were heat-melt adhered together. The web had a metsuke of 23 g/m² and uniformity index of 0.22, strength of lengthwise direction of 4.26 kg/5 cm, and strength of lateral direction of 3.81 kg/5 cm.

In a separate step, a non-woven fabric of melt-blow ultrafine mixed fibers was prepared by the same method as in Example 1 with the following exception:

Spinneret was used which had an orifice diameter of 0.3 mm and spinning orifices for a first component and second component perforated at a ratio of 2/1. The same terpolymer as used in Example 1 was used as a first component and extruded at 280° C., and a polypropylene having a melting point of 166° C. and MFR of 74 (230° C., g/10 min) was used as a second component and extruded at 280° C. Fibers formed was blown under such conditions that the temperature of heated air was 380° C. and the pressure of the air was 1.8 kg/cm². Heat treatment after spinning was not conducted.

Fibers in the non-woven fabric had a fiber diameter of 2.9 μm, and the non-woven fabric had a metsuke of 18 g/m². The non-woven fabric was one in which fibers in the web were weakly heat-melt adhered due to the heat of themselves afforded at the time of spinning. The non-woven fabric had a uniformity index of 0.15, strength of lengthwise direction of 0.40 kg/5 cm, strength of lateral direction of 0.46 kg/5 cm, and apparent density of 0.060 g/cm³.

Next, the spun bond non-woven fabric and the melt-blow non-woven fabric each mentioned above were laminated and subjected to a treatment in three stages with water streams by using a spunlace apparatus under the condition that the pressure was 50, 60, and 50 kg/cm2 to entangle fibers. Thereafter, the laminated non-woven fabric was heated in the same manner as in Example 1 at 150° C. to obtain a laminated non-woven fabric having a two-layer structure and both layers in which laminated fabric were heat-melt adhered. Metsuke of the laminate was slightly decreased to 40 g/m², caused either by the spunlace treatment or heat treatment. Also, the laminated non-woven fabric had a uniformity index of 0.07, strength of lengthwise direction of 6.87 kg/5 cm, and strength of lateral direction of 5.22 kg/5 cm. Further, apparent density of the melt-blow non-woven fabric determined after cutting the laminated surface with a razor and peeling off the laminated surface of the laminated non-woven fabric increased to 0.099 g/cm³ by the spunlace treatment and heat treatment after lamination.

Laminated non-woven fabric thus obtained had a good hand feeling, no falling off of fibers, no polymer particles, and a peeling strength of 622 g/5 cm.

EXAMPLE 4

Two laminated non-woven fabrics which had a two-layer structure in which both layers were heat-melt adhered and obtained in the same manner as Example 2 were again laminated so that the layers of spun bond non-woven fabric were arranged inside and the layers of the melt-blow non-woven fabric were arranged outside, and heat treated at 140° C. by using a heated air alternately ejecting type heater to obtain a non-woven fabric having a four-layer structure in which the layers of the spun bond non-woven fabrics were heat-melt adhered together. The laminated non-woven fabric had a metsuke of 77 g/m², uniformity index of 0.10, strength of lengthwise direction of 13.55 kg/5 cm, strength of lateral direction of 10.43 kg/5 cm, and apparent density of the melt-blow non-woven fabric of 0.054 g/cm³.

Laminated non-woven fabric thus obtained had a good hand feeling, no falling off of fibers, no polymer particles, and a peeling strength of 172 g/5 cm. The laminated non-woven fabric can be used as household wipers as it is or after applied with one of various kinds of lubricants or the like by an immersion method or spray method.

COMPARATIVE EXAMPLE 3

Polypropylene having a melting point of 165° C. and MFR of 60 (230° C., g/10 min) was extruded through a spinneret for regular fiber for spun bond and having an orifice diameter of 0.4 mm at an extrusion temperature of 300° C., and sucked with an air sucker at a rate of 3,000 m/min. Fibers thus formed were blown on a net conveyer together with air. Blown air was sucked and removed through an aspiration exhaust apparatus provided below the net conveyer. Fibers in the web thus obtained were regular fibers having a fineness of 1.5 d/f. The web was heated with a through air type heater at a temperature of 162° C. to obtain a non-woven fabric in which fabric fibers were heat-melt adhered together. The non-woven fabric had a metsuke of 18 g/m², uniformity index of 0.75, strength of lengthwise direction of 2.10 kg/5 cm, and strength of lateral direction of 1.35 kg/5 cm. While the non-woven fabric was heated at a temperature slightly lower than the melting point of the fibers, heat-melt adhesion at one side of the surface was insufficient, and creases were produced due to the shrinkage of fibers at the time of heating.

In a separate step, a melt-blow non-woven fabric was prepared by the same method as in Example 1 with the following exception:

Spinneret for regular fibers and having an orifice diameter of 0.3 mm was used. Spinning was conducted by using a polypropylene having a melting point of 166° C. and MFR of 74 (230° C., g/10 min) and extruding at an extrusion temperature of 290° C. Fibers thus formed were blown under such conditions that the temperature of heated air was 380° C. and pressure of the air was 2.0 kg/cm² to obtain a web of ultrafine fibers. Heat treatment with a through air type heater after spinning was not conducted.

Fibers in the web thus obtained had a fiber diameter of 3.2 µm and web was one in which heat-melt adhesion existed between fibers due to the heat of themselves afforded at the time of spinning and thus the web was something like a non-woven fabric. The non-woven fabric had a metsuke of 18 g/m², uniformity index of 0.21, strength of lengthwise direction of 0.72 kg/5 cm, strength of lateral direction of 0.60 kg/5 cm, and apparent density of 0.078 g/cm³.

Next, the spun bond non-woven fabric and the polypropylene melt-blow non-woven fabric each mentioned above were laminated and heated by using a through air type heater in the same manner as in Example 1 at 162° C. to obtain a non-woven fabric having a metsuke of 39 g/m² and a two-layer structure in which laminated fabric both layers were heat-melt adhered. The laminated non-woven fabric had a uniformity index of 0.63, strength of lengthwise direction of 4.87 kg/5 cm, and strength of lateral direction of 4.24 kg/5 cm. While the non-woven fabric was heat treated at a temperature slightly lower than the melting point of polypropylene, creases were produced due to the shrinkage of fibers. Further, apparent density of the melt-blow non-woven fabric determined after cutting the laminated surface with a razor and peeling off the fabric increased to 0.081 g/cm³ by the heat treatment after lamination.

Laminated non-woven fabric thus obtained had no falling off of fibers, no polymer particles, and a peeling strength of 266 g/5 cm. The non-woven fabric had creases and poor hand feeling.

COMPARATIVE EXAMPLE 4

Melt-blow non-woven fabric was prepared by the same method as in Example with the following exception:

Spinneret for regular fibers and having an orifice diameter of 0.3 mm was used. Spinning was conducted by using a polyethylene terephthalate having a melting point of 257° C. and extruding at an extrusion temperature of 300° C. Formed fibers were blown under the conditions that the temperature of heated air was 360° C. and the pressure of the air was 1.8 kg/cm² to obtain a web of ultrafine fibers. Heat treatment with a through air type heater after spinning was not conducted.

Fibers in the web thus obtained had an average fiber diameter of 5.2 µm. The web had almost no heat-melt adhesion between fibers due to the heat of themselves afforded at the time of spinning, and when the web was pressed with a hand, nap adhered all over the hand surface. The web had a uniformity index of 0.22, metsuke of 16 g/m², strength of lengthwise direction of 0.03 kg/5 cm, strength of lateral direction of 0.01 kg/cm, and apparent density of 0.070 g/cm³.

Next, the composite, spun bond non-woven fabric obtained in Example 3 and the met-blow web mentioned above were laminated and heated by using a through air type heater in the same manner as in Example 1 at 148° C. to obtain a laminated non-woven fabric having a two-layer structure in which both layers were heat-melt adhered. Metsuke of the laminated non-woven fabric was 39 g/m².

Also, the laminated non-woven fabric had a uniformity index of 0.25, strength of lengthwise direction of 4.63 kg/5 cm, and strength of lateral direction of 3.92 kg/5 cm. Further, apparent density of the melt-blow non-woven fabric determined after cutting the laminated surface of the laminated non-woven fabric with a razor and peeling off the fabric was 0.072 g/cm³. Peeling strength of the laminated non-woven fabric was 4.9 g/5 cm.

Laminated non-woven fabric thus obtained had a good hand feeling and no polymer particles. However, many fibers were fell off the fabric. Further, when the surface of the laminated non-woven fabric was strongly rubbed with a hand, both layers was readily peeled off.

EXAMPLE 5

Composite, spun bond non-woven fabric and the non-woven fabric of melt-blow ultrafine mixed fibers each obtained in Example 1 were laminated and pressed under a heated condition with a heated embossing roll. The embossing roll had an area of convex portions of 15% and used in combination with a calender roll in such an arrangement that the melt-blow non-woven fabric contacted with the embossing roll. As to the heat-pressing conditions, the temperature of the embossing roll was 120° C., the temperature of the calender roll was 125° C., and the linear pressure was 55 kg/cm.

The laminated non-woven fabric thus obtained had a uniformity index of 0.09 and metsuke of 38 g/m². Apparent density of the non-woven fabric of ultrafine mixed fibers determined after cutting the laminated surface of the laminated non-woven fabric with a razor and peeling off the fabric was 0.13 g/cm³. Further, the laminated non-woven fabric had a strength of lengthwise direction of 15.53 kg/5 cm, strength of lateral direction of 11.98 kg/5 cm, and peeling strength of 1,520 g/5 cm.

The laminated non-woven fabric had a good hand feeling and no polymer particles. Also, the fabric has no falling off of fibers.

EXAMPLE 6

Non-woven fabric of melt-blow ultrafine mixed fibers was prepared by the same method as in Example 1 with the following exception:

Spinning was conducted by using a high density polyethylene having a melting point of 133° C. and MFR of 33 (190° C., g/10 min) as a first component and a polypropylene having a melting point of 167° C. and MFR of 30 (230° C., g/10 min) as a second component, and extruding both components at an extrusion of 270° C. Fibers thus formed were blown under such conditions that the temperature of the heated air was 360° C. and the pressure of the air was 2.3 kg/cm² to form a web of ultrafine mixed fibers having a mixing ratio of 50/50% by weight. Fibers in the web thus obtained had a fiber diameter of 7.1 µm. The web had heat-melt adhesion between fibers due to the heat of themselves afforded at the time of spinning and thus, the web was something like a non-woven fabric. The web was heated by using an air through type heater at a temperature of 143° C. to obtain a heat-melt adhered non-woven fabric. The non-woven fabric had a metsuke of 18 g/m². Also, the non-woven fabric was found through the touch to have a small number of polymer particles. The non-woven fabric had a uniformity index of 0.26, strength of lengthwise direction of 1.92 kg/5 cm, strength of lateral direction of 1.28 kg/5 cm, and apparent density of 0.062 g/cm³.

Next, the composite, spun bond non-woven fabric obtained in Example 1 and the melt-blow non-woven fabric mentioned above were laminated and heated by the same manner as in Example 1 at 145° C. to obtain a laminated non-woven fabric of a two-layer structure in which laminated fabric both layers were heat-melt adhered. Metsuke of the laminate slightly increased to 38 g/m² by the heat treatment. Also, the laminated non-woven fabric had a uniformity index of 0.16, strength of lengthwise direction of 6.61 kg/5 cm, and strength of lateral direction of 5.35 kg/5 cm. Further, apparent density of the melt-blow non-woven fabric determined after cutting the laminated surface of the laminated non-woven fabric with a razor and peeling off the fabric was 0.070 g/cm³.

The laminated non-woven fabric had no falling off of fibers. Polymer particles of the melt-blow non-woven fabric was 3.2/m². The laminated non-woven fabric had a good softness, nearly no rough feeling due to the polymer particles, and good hand feeling. This laminated non-woven fabric was able to use as heat insulating materials and filter materials.

EXAMPLE 7

Commercially available paper diaper plane surface of which had roughly such an "T" shape as the cross-section of a rail of railway and inside of which was provided with side gathers was used, and only the surface material arranged near leg portions of the paper diaper was replaced by the laminated multi-layer non-woven fabric prepared in Example 1.

Specifically, the commercially available paper diaper comprised (a) polyethylene/polypropylene type heat-melt adhesive composite staple fibers as front surface material crossing points of which fibers were heat-melt adhered, (b) a water absorptive material comprising a pulp and a highly water absorptive resin as main components, and © a polyethylene film as back surface material. Only near both leg portions of the non-woven fabric was cut off with a knife and removed from the paper diaper. Laminated multi-layer non-woven fabric obtained in Example 1 was laminated on near both of the leg portions in such an arrangement that the layer of the non-woven fabric of melt-blow ultrafine mixed fibers is placed to the side of the skin and the layer of the composite, spun bond non-woven fabric is placed to the side of the polyethylene film as the back surface material. Further, three polyurethane elastic yarns were put, in a stretched condition, between the front surface material and back surface material, remaining non-woven fabric positioned near the center portion and the laminated non-woven fabric were heat-melt adhered, and further, the back surface material and the laminated multi-layer non-woven fabric were heat-melt adhered. Remaining laminated multi-layer non-woven fabric was cut off with scissors to obtain a paper diaper in which the side of the non-woven fabric of melt-blow ultrafine mixed fibers of the laminated non-woven fabric was placed on the skin side of the leg portions. This diaper was curved roughly in a shape of bow by means of the elastic yarns arranged at both leg portions. The diaper had a soft hand feeling at leg portions, liquid leakage from the legs portions was prevented since the melt-blow non-woven fabric was water repellent, and thus the diaper was particularly desirable as one for newborn babies.

Laminated non-woven fabrics of the present invention comprise a composite, spun bond non-woven fabric and a non-woven fabric of melt-blow ultrafine mixed fibers laminated therewith, and have a good hand feeling and high strength. Also, the laminated non-woven fabrics of the present invention have a high peeling strength and no falling off of fibers since the fibers in the non-woven fabric of ultrafine mixed fibers are heat-melt adhered together at their crossing points and the melt-blow non-woven fabric is heat-melt adhered with the low melting point component in the composite, spun bond long fiber non-woven fabric. Further, the laminated non-woven fabrics of the present invention have no polymer particles and thus they have no rough feeling and no skin irritation property.

We claim:

1. A laminated multi-layer non-woven fabric comprising a layer of a composite, spun bonded non-woven fabric and a layer of a non-woven fabric of melt-blown ultrafine mixed fibers comprising fibers having an average fiber diameter of 10 μm or less, and being laminated with the layer of said composite, spun bonded non-woven fabric, said composite, spun bond non-woven fabric comprising composite long fibers containing a low melting point resin component and a high melting point resin component having a melting point difference of 10° C. or more, said low melting point resin component forming at least a part of fiber surface, said composite long fibers being heat-melt adhered through the melt of said low melting point resin component, said non-woven fabric of melt-blown ultrafine mixed fibers comprising 10 to 90% by weight of low melting point ultrafine fibers and 90 to 10% by weight of high melting point ultrafine fibers, melting point difference between said low melting point ultrafine fibers and said high melting point ultrafine fibers being 10° C. or more, said low melting point ultrafine fibers and said high melting point ultrafine fibers being heat-melt adhered through the melt of said low melting point ultrafine fibers, and the layer of said composite, spun bonded non-woven fabric and the layer of said non-woven fabric of melt-blown ultrafine mixed fibers being integrated through heat-melt adhesion of said low melting point resin component in said composite, spun bonded non-woven fabric and/or said low melting point ultrafine fibers in said non-woven fabric of melt-blown ultrafine mixed fibers.

2. The laminated multi-layer non-woven fabric according to claim 1 wherein said composite long fibers in said composite, spun bonded non-woven fabric have a fineness of 0.5 to 10 d/f, said ultrafine fibers in said non-woven fabric of melt-blown ultrafine mixed fibers have a fiber diameter of 0.1 to 10 μm, said non-woven fabric of melt-blown ultrafine mixed fibers has 10/m² or less of, or no polymer particles having a diameter of 0.1 mm or more on the surface thereof and apparent density of 0.02 to 0.20 g/cm³, said laminated non-woven fabric has a lateral strength of 0.6 kg/5 cm or more, a uniformity index of 0.6 or less, and a peeling strength of said two layers of 6 g/5 cm or more.

3. An absorptive article comprising, as at least one constituent member thereof, a laminated multi-layer non-woven fabric defined in claim 1 or 2.

4. The absorptive article according to claim 3 wherein said absorptive article comprises a laminated multi-layer non-woven fabric of two layer structure comprising a composite, spun bonded non-woven fabric and a non-woven fabric of melt-blown ultrafine mixed fibers; or comprises a laminated multi-layer non-woven fabric of three- or more-layer structure comprising one or more non-woven fabric of melt-blown ultrafine mixed fibers and one or more said composite, spun bonded non-woven fabric, said non-woven fabric of melt-blown ultrafine mixed fibers being arranged on the surface of at least one side of said laminated multi-layer non-woven fabric.

5. A process for producing a laminated multi-layer non-woven fabric comprising the steps of;

spinning a low melting point resin and a high melting point resin having a melting point difference of 10° C. or more to form composite long fibers in such a manner that said low melting point resin forms at least a part of fiber surface, forming a web or forming a non-woven fabric by heating the web after the spinning at the heat-melt adhering temperature of said web or higher to form a non-woven fabric in which fibers are heat-melt adhered, by a composite, spun bond method;

forming low melting point ultrafine fibers and high melting point ultrafine fibers both of said fibers having an average fiber diameter of 10 μm or less and having a melting point difference between both of said fibers of 10° C. or more, into a web of ultrafine mixed fibers having no self-heat-melt adhesion or having a self-heat-melt adhesion at the time of the spinning, into a non-woven fabric having self-heat-melt adhesion at the time of the spinning, or into a non-woven fabric of melt-blown ultrafine mixed fibers in which fibers are heat-melt adhered by heating the web after the spinning at the heat-melt adhering temperature of the web or higher, and each comprising 10 to 90% by weight of low melting point ultrafine fibers and 90 to 10% by weight of high melting point ultrafine fibers, by a melt-blow mixed fiber method;

laminating the layer of said composite, spun bonded web or heat-melt adhered non-woven fabric with the layer of said web of melt-blown ultrafine mixed fibers or heat-melt adhered non-woven fabric of melt-blow ultrafine mixed fibers, and heating them at the temperature at which both of said layers are heat-melt adhered or higher.

6. The process for producing a laminated multi-layer non-woven fabric according to claim 5 wherein said process further comprises a step in which fibers in said web or non-woven fabric in a layer are entangled with those in another layer with a needle punch or a spunlace mean before or after heating.

7. The process for producing a laminated multi-layer non-woven fabric according to claim 5 or 6 wherein said heating is performed by using a through-air type heater and heated air is ejected from the side of said composite, spun bonded non-woven fabric to the side of said non-woven fabric of melt-blown ultrafine mixed fibers.

8. The process for producing a laminated multi-layer non-woven fabric according to claim 5 or 6 wherein both of said layers are heat-pressed by using an embossing roll having a heat-pressing area of 5 to 25%.

9. The process for producing a laminated multi-layer non-woven fabric according to claim 5 or 6 wherein a composite, spun bonded non-woven fabric and a non-woven fabric of melt-blown ultrafine mixed fibers both having a uniformity index of 0.6 or less are used.

10. The process for producing a laminated multi-layer non-woven fabric according to claim 5 or 6 wherein both of said layers are heated by using a heater of a type from which heated air is ejected alternately, and heated air is ejected alternately from the front surface or back surface of said non-woven fabric of a multi-layer structure.

* * * * *